US010652274B2

(12) United States Patent
Barak et al.

(10) Patent No.: US 10,652,274 B2
(45) Date of Patent: **\*May 12, 2020**

(54) IDENTIFYING AND RESPONDING TO SECURITY INCIDENTS BASED ON PREEMPTIVE FORENSICS

(71) Applicant: Palo Alto Networks, Inc., Santa Clara, CA (US)

(72) Inventors: Gil Barak, Ra'anana (IL); Shai Morag, Tel Aviv-Jaffa (IL)

(73) Assignee: PALO ALTO NETWORKS, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/391,285

(22) Filed: Apr. 22, 2019

(65) Prior Publication Data

US 2019/0253437 A1 Aug. 15, 2019

Related U.S. Application Data

(63) Continuation of application No. 15/838,802, filed on Dec. 12, 2017, now Pat. No. 10,270,805, which is a continuation of application No. 14/944,773, filed on Nov. 18, 2015, now Pat. No. 9,888,031.

(60) Provisional application No. 62/081,616, filed on Nov. 19, 2014.

(51) Int. Cl.
*H04L 29/06* (2006.01)
(52) U.S. Cl.
CPC ........ *H04L 63/145* (2013.01); *H04L 63/1416* (2013.01)

(58) Field of Classification Search
CPC .................................................. H04L 63/145
See application file for complete search history.

(56) References Cited

U.S. PATENT DOCUMENTS

| 8,424,094 | B2* | 4/2013 | Neystadt ............... H04L 63/308 380/282 |
| 8,621,607 | B2* | 12/2013 | Pike ........................ G06F 21/52 709/203 |
| 9,529,996 | B2 | 12/2016 | Qureshi et al. |
| 9,703,954 | B2* | 7/2017 | Guri ........................ G06F 21/54 |
| 10,380,357 | B1* | 8/2019 | McEachron .......... G06F 21/123 |
| 2005/0193173 | A1 | 9/2005 | Ring et al. |
| 2007/0067366 | A1* | 3/2007 | Landis ................. G06F 12/1009 |
| 2007/0282951 | A1* | 12/2007 | Selimis .................... H04L 67/06 709/205 |

(Continued)

*Primary Examiner* — Ali Shayanfar
(74) *Attorney, Agent, or Firm* — Gilliam PLLC

(57) ABSTRACT

A system is connected to a plurality of user devices coupled to an enterprise's network. The system continuously collects, stores, and analyzes forensic data related to the enterprise's network. Based on the analysis, the system is able to determine normal behavior of the network and portions thereof and thereby identify abnormal behaviors within the network. Upon identification of an abnormal behavior, the system determines whether the abnormal behavior relates to a security incident. Upon determining a security incident in any portion of the enterprise's network, the system extracts forensic data respective of the security incident and enables further assessment of the security incident as well as identification of the source of the security incident. The system provides real-time damage assessment respective of the security incident as well as the security incident's attributions.

14 Claims, 6 Drawing Sheets

(56) References Cited

U.S. PATENT DOCUMENTS

| | | | |
|---|---|---|---|
| 2009/0106174 A1 | 4/2009 | Battisha et al. | |
| 2010/0202627 A1* | 8/2010 | Gray | H01M 10/465 381/77 |
| 2010/0205667 A1* | 8/2010 | Anderson | G06F 3/013 726/19 |
| 2011/0153748 A1* | 6/2011 | Lee | H04L 67/125 709/205 |
| 2011/0231564 A1 | 9/2011 | Korsunsky et al. | |
| 2012/0240185 A1 | 9/2012 | Kapoor et al. | |
| 2013/0276056 A1* | 10/2013 | Epstein | G06F 21/604 726/1 |
| 2013/0305357 A1* | 11/2013 | Ayyagari | H04W 12/06 726/22 |
| 2014/0105174 A1 | 4/2014 | Agrawal et al. | |
| 2014/0283068 A1* | 9/2014 | Call | H04L 63/1425 726/23 |
| 2014/0297922 A1* | 10/2014 | Sarangdhar | G06F 13/16 711/103 |
| 2014/0325661 A1* | 10/2014 | Hoog | G06F 21/552 726/25 |
| 2015/0007315 A1* | 1/2015 | Rivera | G06F 21/51 726/23 |
| 2015/0222646 A1* | 8/2015 | Diehl | H04L 63/1416 726/23 |
| 2015/0348209 A1 | 12/2015 | Unser et al. | |
| 2016/0078240 A1* | 3/2016 | Kang | G06F 21/64 726/31 |
| 2016/0080397 A1* | 3/2016 | Bacastow | H04L 63/1408 726/1 |
| 2016/0099972 A1 | 4/2016 | Qureshi et al. | |
| 2016/0127359 A1 | 5/2016 | Minter et al. | |
| 2016/0149938 A1* | 5/2016 | Barak | H04L 63/1416 726/23 |
| 2016/0269434 A1 | 9/2016 | DiValentin et al. | |
| 2016/0371163 A1* | 12/2016 | Swierk | G06F 11/2284 |

* cited by examiner

IDENTIFYING AND RESPONDING TO SECURITY INCIDENTS BASED ON PREEMPTIVE FORENSICS

BACKGROUND

Field

Embodiments generally relate to data security, and more specifically, to preventing security incidents in a computerized environment.

Related Art

Nowadays, as organizations and enterprises get bigger, they are more and more exposed to malicious attacks. Kaspersky® reports detections of over 300,000 different malware variants in a single day. The United Kingdom government reports over 100,000 cyber-attacks on British companies every day.

In order to identify such attacks, a number of different anti-virus applications are currently available. Such anti-virus applications force security teams of large enterprises to manage thousands of new alerts every day, when responding to a single alert may take days, weeks and sometimes months.

These applications must be deployed into a computerized environment and attempt to identify malicious activity within the network. Other solutions may also be known. For example, anti-virus solutions that detect and remove known viruses by identifying "signatures" of such viruses may be available. The majority of these solutions rely upon a basic engine that searches suspect files for the presence of predetermined virus signatures. However, these related art solutions for identifying security incidents are not effective enough and malicious activity may go undetected.

In the view of the shortcoming of related art, it would be advantageous to provide an efficient solution for detecting security incidents in a computerized environment by automatically validating security alerts. It would further be advantageous if such solution shall further enable a real-time assessment of damages resulted from a security incident.

SUMMARY

An aspect, among other exemplary aspects, which will become apparent from reading the description herein of exemplary embodiments, is to provide a system, a method, a computer readable medium, and an apparatus to overcome the above-mentioned problems by accurately detecting security incidents in a computerized environment and by providing real-time assessment of damages resulting from a security incident.

Illustrative, non-limiting embodiments may overcome the above-noted disadvantages and problems in the prior art, and also may have been developed to provide solutions to other disadvantages and problems that were not described above. However, a method, an apparatus, a system, and a computer readable medium that operates according to the teachings of the present disclosure is not necessarily required to overcome any of the particular problems or disadvantages described above. It is understood that one or more exemplary embodiment is not required to overcome the disadvantages described above, and may not overcome any of the problems described above.

According to an aspect of an exemplary embodiment, a computerized method of managing data security is provided. The method includes continuously collecting forensic data related to a plurality of network-connected user devices; determining, by the computer, at least one normal behavior pattern associated with at least one of the plurality of user devices based on the collected forensic data; identifying, by the computer, at least one abnormal behavior in the forensic data based on the determined at least one normal behavior pattern and in response to the identifying of the at least one abnormal behavior, by the computer, outputting a security incident notification.

According to yet another aspect of an exemplary embodiment, a method of validating security alerts in a computerized environment is provided. The method includes continuously collecting forensic data related to a plurality of network-connected user devices, identifying, by a computer, at least one suspicious event by applying preset rules to the collected forensic data, in response to the identified at least one suspicious event, determining, by the computer, a context of the at least one suspicious event based on the collected forensic data, and storing, in a memory, the determined context of the at least one suspicious event.

According to yet another aspect of an exemplary embodiment, an apparatus for managing data security is provided. The apparatus includes a memory configured to store executable instructions and a processor configured to execute the instructions, which when executed cause the processor to: receive forensic data from a plurality of network-connected user devices, the forensic data is continuously collected by agents running on the plurality of network-connected user devices; determine at least one of: a normal behavior pattern associated with at least one of the plurality of user devices based on the collected forensic data and at least one suspicious event by applying preset rules to the received forensic data; in response to the determining the at least one normal behavior pattern, identify at least one abnormal behavior in the forensic data based on the determined at least one normal behavior pattern, and in response to the identifying of the at least one abnormal behavior, output a security incident notification, in response to the determining the at least one suspicious event, determining a context of the suspicious event based on the collected forensic data and storing the determined context.

BRIEF DESCRIPTION OF THE DRAWINGS

The accompanying drawings, which are incorporated in and constitute a part of this specification exemplify the exemplary embodiments and, together with the description, serve to explain and illustrate exemplary embodiments. Specifically.

DETAILED DESCRIPTION OF EXEMPLARY EMBODIMENTS

Figure 1:
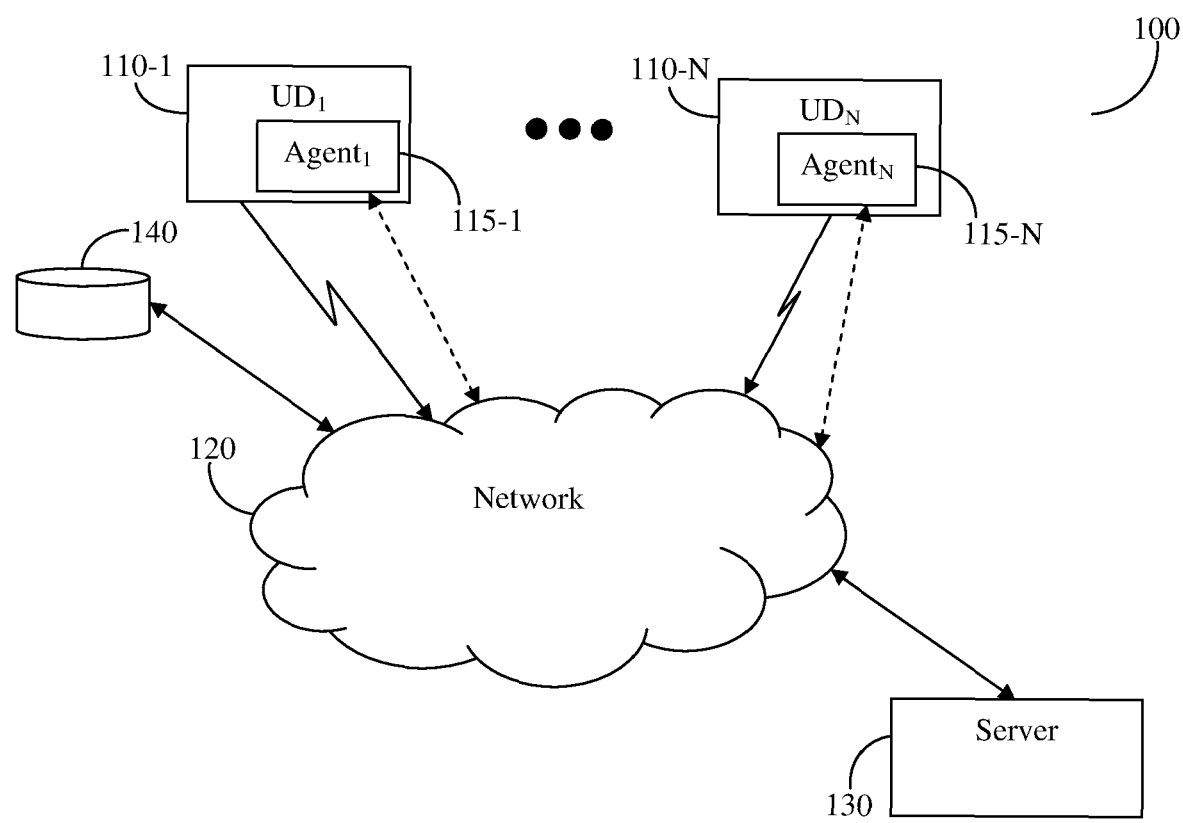
FIG. 1—is a block diagram illustrating a network system according to an exemplary embodiment.

Exemplary embodiments will be described in detail herein with reference to accompanying drawings so as to be easily realized by a person having ordinary skill in the art. The exemplary embodiments should not be treated as limiting and it should be clear that several alternate embodiments and other alternate implementations are possible. Descriptions of well-known parts and steps are omitted for clarity.

It is important to note that exemplary embodiments disclosed herein are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality. In the drawings, like numerals refer to like parts through several views.

According to an exemplary embodiment, a system is connected to a plurality of user devices coupled to an enterprise's network. The system continuously collects and stores forensic data related to the enterprise's network. The system analyses the collected data. Based on the analysis, the system determines normal or regular behavior of the network and portions thereof and thereby identifies abnormal or irregular behaviors within the network. Upon identification of an abnormal behavior, the system identifies whether the abnormal behavior relates to a security incident. Upon identification of a security incident in any portion of the enterprise's network, the system extracts forensic data respective of the security incident and enables further assessment of the security incident as well as identification of the source of the security incident. According to an exemplary embodiment, the system may further provide real-time damage assessment respective of the security incident as well as the security incident's attributions.

According to various exemplary embodiments, malicious activity in a computer network, a combination of networks, and/or hybrid networks may be identified efficiently, accurately, and more thoroughly. Security alerts may be identified as suspicious activities without being escalated to a security incident automatically by the server. Further, more accurate identification of a security incident may be provided by analyzing a regular behavior pattern for an entity, an application, a process, and so on and identifying behavior outside the regular pattern as a security incident. Further, according to various exemplary embodiments, a thorough understanding of the security incident may be obtained by providing contextual data for the security incident which may include by way of an example events, processes, and attributes of the incident including entities involved and its sources.

FIG. 1 depicts an exemplary and non-limiting block diagram of a system according to an exemplary embodiment. A plurality of user devices (UD) 110-1 through 110-N (collectively referred hereinafter as user devices 110 or individually as a user device 110, merely for simplicity purposes), where N is an integer equal to or greater than 1, are communicatively connected to an enterprise's network 120. The user devices 110 can be, but are not limited to, smart phones, mobile phones, laptops, tablet computers, wearable computing devices, personal computers (PCs), a combination thereof and the like. A user device may comprise a memory and a processor. A user device may further comprise a user input interface configured to receive user input, a display configured to display contents on a screen, and a communication interface such as a network card, configured to communicate with the network 120. The network 120 may comprise busses, local area network (LAN), wide area network (WAN), metro area network (MAN), worldwide web (WWW), Internet, as well as a variety of other communication networks, whether wired or wireless, and in any combination, that enable the transfer of data between the different elements or entities of the system 100.

A server 130 is further connected to the network 120. The server 130 is configured to collect forensic data of the network 120. The forensic data may include, for example, but not by way of limitation, communication data, file system data, processes related to the network 120 of the user devices 110 coupled thereto, physical activity performed on the network 120, user activities' within the network 120, modules within the network 120, activities performed by hardware devices coupled to the network 120, operating system' processes in the user devices 110, a combination thereof and more. The modules may include, for example, processes, libraries, threads, etc. Hardware devices may include, for example sensors such as cameras, microphones, universal serial bus (USB), peripherals, etc.

According to an exemplary embodiment, the collection of the forensic data may be performed by the server 130 using a plurality of agents 115-1 through 115-N installed respectively on the user devices 110. Each of the agents 115 may be implemented as an application program having instructions that may reside in a memory of its respective user device 110. Each agent 115 is further communicatively connected to the server 130 over the network 120. For example, each agent 115 may be a plug in being executed and running on a respective user device 100. Each plug in communicates with a main component that is executed and/or running on a server. The main component may include an application with communication interfaces for the agents 115 and a processing component that parses and analyzes forensic data images received from the respective agents. The main component may further include communication interfaces to communicate with other elements on the server and/or database.

According to an exemplary embodiment, each agent 115 is configured to monitor the activity of the respective user device 110 over the network 120 and collect forensic data respective thereof. The forensic data is then sent to the server 130 for further analysis. According to another exemplary embodiment, the forensic data may be sent for storage to a database 140 communicatively coupled to the server 130 over, for example, the network 120. The database 140 is accessible by the server 130, thereby enabling the server 130 to analyze the forensic data upon demand. According to yet another exemplary embodiment, the forensic data collected by an agent 115 may be sent directly to the database 140 over the network 120.

Respective of the analysis of the forensic data, the server 130 determines a normal and/or regular behavior pattern associated with the network 120, the user devices 110 as well as for portions thereof. The normal and/or regular behavior pattern(s) is set by the server 130 as a reference in order to monitor the operation of the network 120 and the user devices 110 thereafter, and to identify abnormal and/or irregular behavior respective thereof.

Upon identification of an abnormal and/or irregular behavior, the server 130 determines whether the abnormal and/or irregular behavior is potentially a security incident. A security incident, as identified by the server 130, may include, for example, malicious software program (Malware), a targeted threat, a combination thereof, etc. Malware may be a Resware, an Adware, a Spamware, a virus, a Botnet, a Spyware, a Trojan, a Crimeware, an advanced persistent threat (APT), and so on. These examples of a security incident are provided by way of an example and not by way of a limitation. Targeted threats may include demilitarized zone (DMZ) server threats, virtual private network (VPN) threats, remote desktop protocol (RDP) threats, universal serial bus (USB) devices installed maliciously, wire/less devices coupled/disconnected maliciously to or from the network 120, etc.

The determination whether a security incident exists may be made by extracting forensic data associated with the abnormal and/or irregular behavior as further described herein below in an exemplary embodiment with respect of FIGS. 5A to 5D. The forensic data associated with the abnormal and/or irregular behavior may further be used by the server 130 in order to identify the source of the security incident. According to an exemplary embodiment, upon determination that the abnormal and/or irregular behavior is a security incident, the server 130 generates a real-time damage assessment respective of the security incident.

Figure 2:
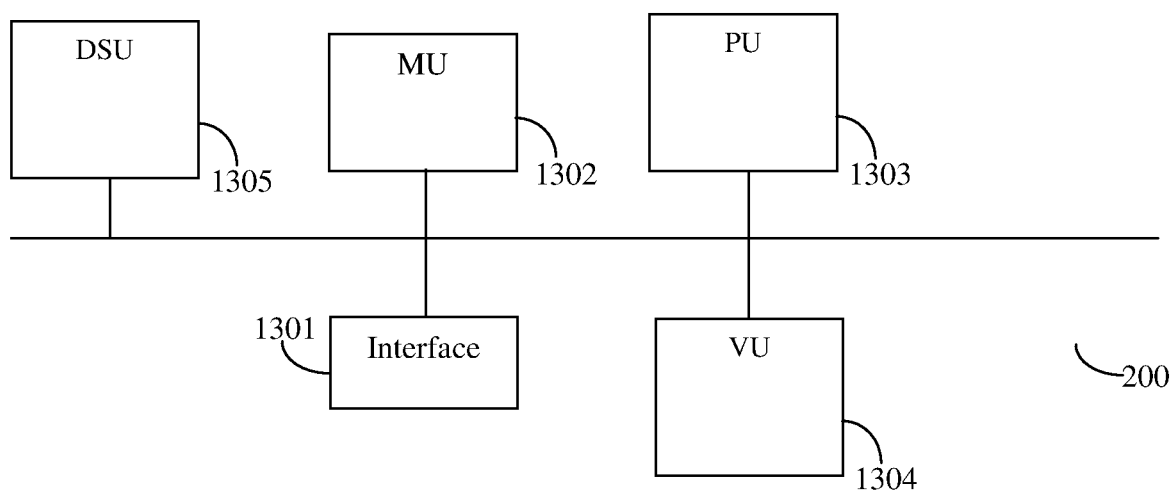
FIG. 2—is a schematic diagram of an apparatus according to an exemplary embodiment.

FIG. 2 is an exemplary and non-limiting schematic diagram of a server 130 according to an exemplary embodiment. The server 130 includes an interface 1301 to the network 120 by which the server 130 sends and receives data over the network 120. The server 130 further includes a mining component (MU) 1302 by which the server 130 collects forensic data, as further described hereinabove by way of an example. According to an exemplary embodiment, the MU 1302 includes the main component running on the server and the plurality of agents 115 installed on the user devices 110. The collected forensic data is then analyzed by a processor (PU) 1303. Optionally, the server 130 further includes a data storage (DSU) 1305 such as a memory, which stores the forensic data or portions thereof for further uses.

Figure 3:
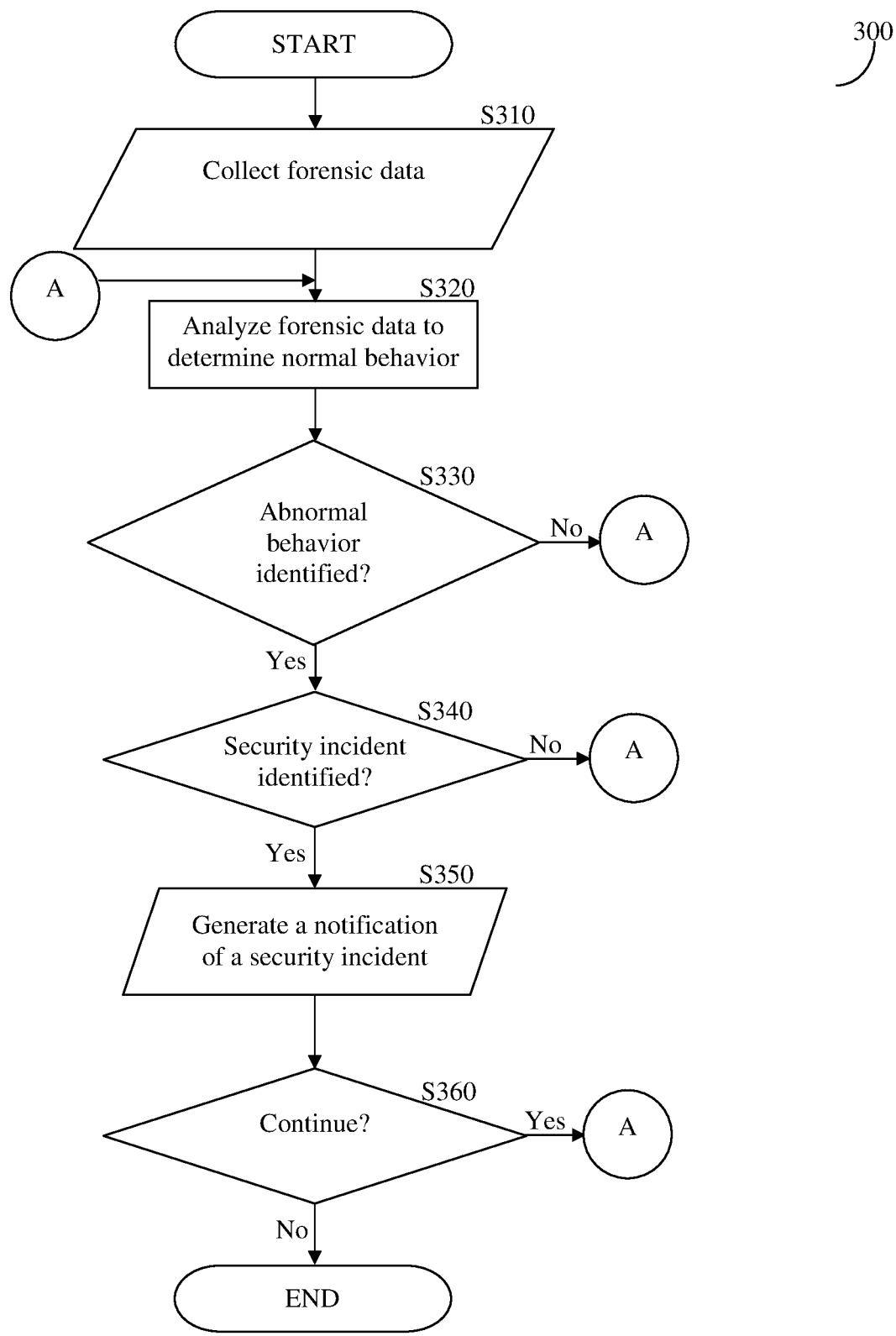
FIG. 3—is a flowchart illustrating a computerized method of identifying security incidents in a computerized environment according to an exemplary embodiment.

FIG. 3 is an exemplary and non-limiting flowchart describing a method of identifying security incidents in a computerized environment according to an exemplary embodiment. In an optional operation S310, forensic data related to the network 120 and/or the user device(s) 110 is continuously collected. That is, an image of the forensic data is made for analysis. According to an exemplary embodiment, the forensic data is collected by the server 130 as further described hereinabove with respect to FIG. 2 by way of an example. Forensic data may include, for example, volatile and non-volatile data. For example, data may include URLs visited by the client, data downloaded or streamed by the client, messages received and sent by the client and so on. By way of another example, the forensic data is collected by one or more security incident report system(s) and forwarded to the server 130. In operation S320, the forensic data is analyzed according to a set of rules to determine normal behavior patterns associated with the network 120, the user devices 110, or portions thereof. For example, an email rule may be set up to identify that one type of abnormal behavior equals to a client sending emails less than five seconds apart for a duration of ten or more minutes. Another rule may be set up to identify another type of an abnormal behavior as an executable file that attempts to modify an operating system, another rule may be set up to identify a script aimed at mass deletion of data in a memory of a client. In yet another exemplary embodiment, neural networks may be used to mimic behavioral patterns of various clients. For example, one client regular pattern of behavior may involve a predetermined amount of data streaming, data sending, data transmission, data reception, data processing, amount of memory used for the processing, and so on. Significant changes to these regular patterns of behavior may be determined as abnormal behavior. Analogously, a client may have a predetermined pattern of behavior regarding an issued number of commands, a number of open applications, amount of memory being used. Any significant variations to these normal patterns may trigger an abnormal behavior. These are provided by way of an example and not by way of a limitation.

In operation S330, it is checked whether an abnormal behavior is identified in the forensic data and if so, execution continues with an operation S340; otherwise, execution continues with an operation S320. It should be clear to one of ordinary skills in the art that validation of abnormal behavior based on forensic data enables a much more accurate identification of security incidents as it removes false positives commonly identified by related art solutions that typically track signatures associated with malicious software programs in enterprises networks. In an exemplary embodiment, analyzing of the forensic data in operation 320 is performed in real-time and on the fly. Additionally, the rules that determine normal behavior may be modified in real time, some may be manually adjusted by the user (turned on or turned off). In yet another exemplary embodiment, some rules may be automatically modified based on an evolving neural network that is in continued training with new data from the client as it becomes available.

In operation S340, it is checked whether the abnormal behavior is associated with a security incident and if so, execution continues with operation S350; otherwise, execution continues with operation S320. For example, security incident may be identified using an additional set of rules e.g., by analyzing signatures of the data source or the source of data generation. This is provided by way of an example and not by way of a limitation. In operation S350, a notification respective of the security incident is generated by the server 130. In operation S360, it is checked whether to continue with the operation and if so, execution continues with operation S310; otherwise, execution terminates.

Figure 4:
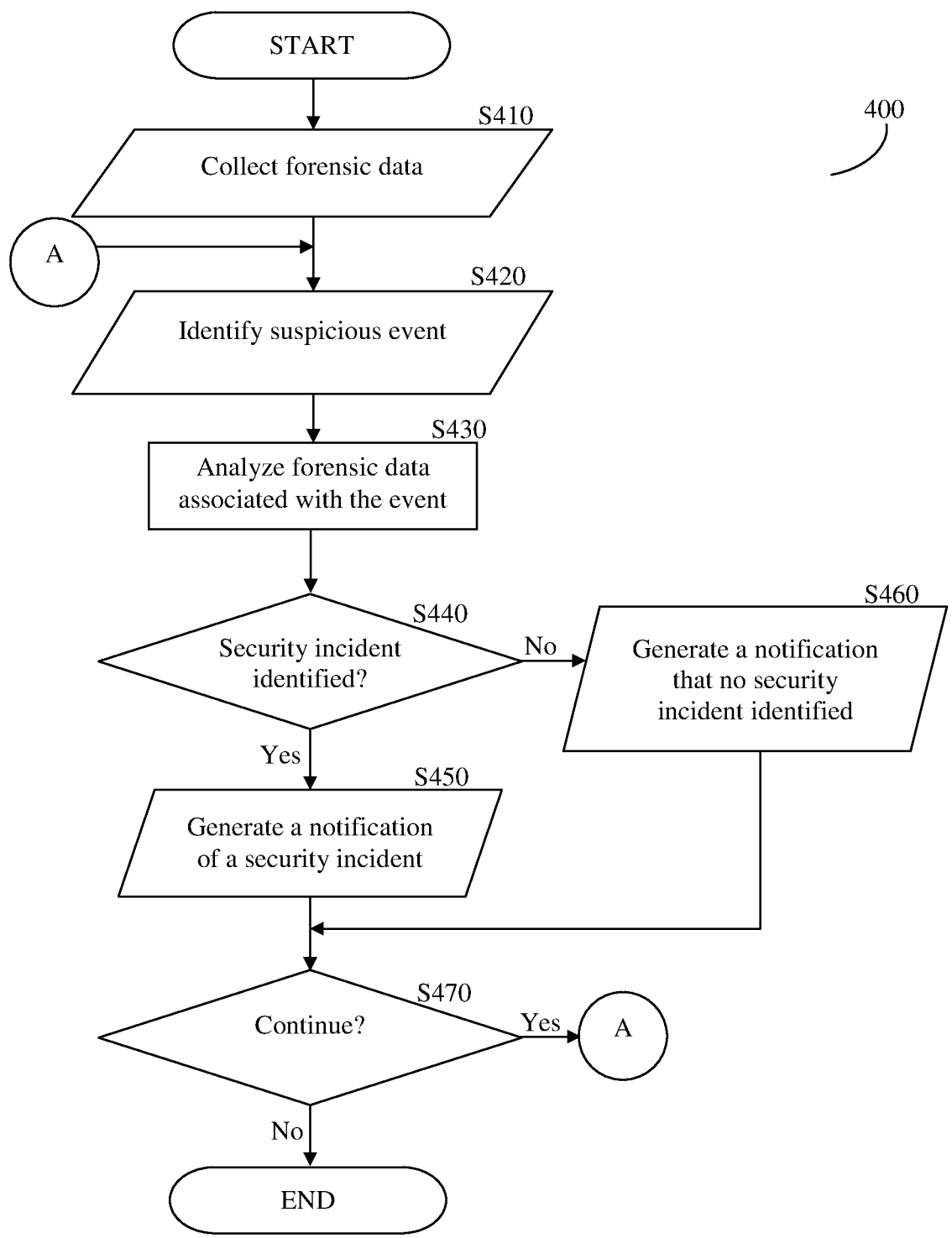
FIG. 4—is a flowchart illustrating a computerized method of validating security incidents in a computerized environment according to an exemplary embodiment.

FIG. 4 is an exemplary and non-limiting flowchart describing a method of validating security alerts in a computerized environment according to an exemplary embodiment. In operation S410, forensic data related to the network 120 and/or the user device(s) 110, and/or a portion thereof, is continuously collected. According to an exemplary embodiment, the forensic data is collected by the server 130 as further described hereinabove by way of an example with respect to FIGS. 2 and 3. In operation S420, at least one suspicious event is identified by the server 130. A suspicious event may be identified according to one or more exemplary techniques described above with reference to FIG. 3, by way of an example. According to an exemplary embodiment, an alert is received indicative of the suspicious event, from a security alert system communicatively coupled to the server 130. In operation S430, forensic data associated to the at least one suspicious event is analyzed to determine a context of the at least one suspicious event. The context is indicative of characteristics related to the event, its past and future behavior, attribution, effects on the system 100, such as, for example, results in crash of the system 100, a memory leak, unwanted popups on the user device 110, etc. In operation S440, it is checked whether the alert is indeed associated with a security incident respective of the context and if so, execution continues with operation S450; otherwise, execution continues with operation S460. In operation S450, a notification respective of the security incident is generated by the server 130. In operation S460, a notification that the alert is not associated with a security incident is generated by the server 130 and execution continues with S470. For example, if the notification indicates that it is not associated with the security incident, it may be added to modify the rules associated or that identify normal behavior or pattern of normal behavior for the system and/or client and/or portion thereof. In operation S470, it is checked whether to continue with the operation and if so, execution continues with S410; otherwise, execution terminates FIGS. 5A to 5D are exemplary and non-limiting views illustrating a display of a security incident attribution according to an exemplary embodiment. Such displays may be generated by the server 130 respective of a security incident in order to show a security incident attribution(s). In other words, in an exemplary embodiment, attributes and/or characteristics of the security incident may be displayed on a screen. According to an exemplary embodiment, the attribution may further be indicative of contextual data associated with the security incident. In an exemplary embodiment, one or more attributes may be displayed that occurred in a security incident. Additionally, in an exemplary embodiment, one or more attributes may be connected using a visual line to show a flow of events in a security incident. In an exemplary embodiment, the flow may indicate a sequence of events or may simply indicate a relational connection and not necessarily a temporal connection. In an example embodiment, the view may show elements that occur at substantially same time.

Figure 5A:
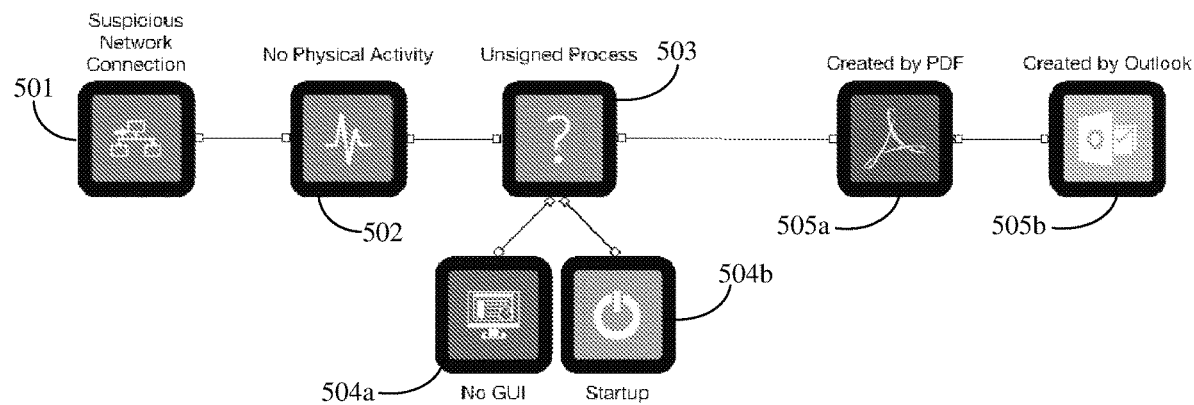
FIG. 5A—is a view illustrating simulation of a display of a security incident attribution according to an exemplary embodiment.

In FIG. 5A, according to an exemplary embodiment, the view indicates that a client had a suspicious network connection 501. After the suspicious network connection is detected, there appears to be no physical activity 502. In an exemplary process after some inactivity as illustrated in 502, an unsigned process is executed 503. It is shown in an exemplary embodiment of FIG. 5A that an unsigned process 503 has no graphical user interface (GUI) 504a and is executed at a startup 504b. In an exemplary embodiment, as shown in FIG. 5A, attributes or characteristics of the unsigned process 503 are shown such that the process is transparent to the user i.e., it has no GUI 504a and it is executed as part of a startup process for its source 504b. Further, in an exemplary embodiment, one or more sources responsible for the unsigned process may also be identified and output for a display. As shown in FIG. 5A, the unsigned process 503 is created by the PDF application 505a and Outlook application 505b. For example, the unsigned process 503 may be generated by the PDF application 505a that is operating via outlook application 505b. In other words, the PDF application 505a may be embedded and/or executed from within the outlook application 505b. That is, in an exemplary embodiment, sources of the security incident are also identified.

Figure 5B:
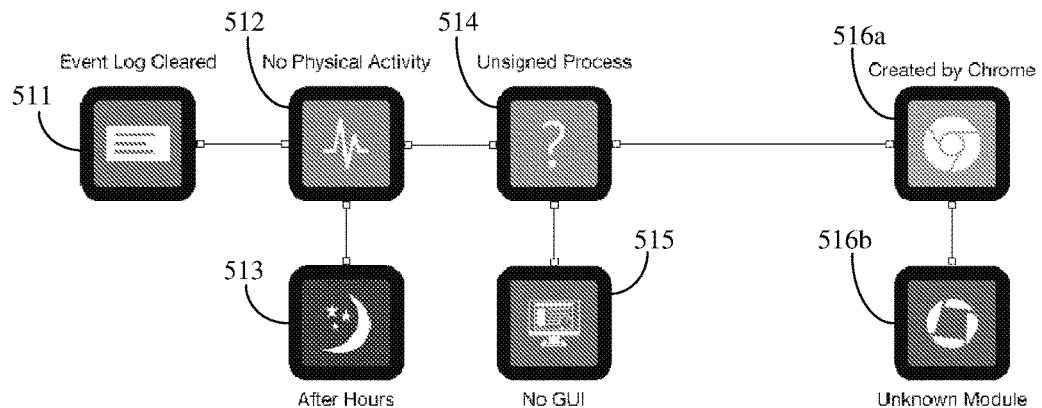
FIG. 5B—is a view illustrating a simulation of a display of a security incident attribution according to an exemplary embodiment.

FIG. 5B is a view illustrating attributes of a security incident in which an event log was cleared according to an exemplary embodiment. In FIG. 5B, an event log is cleared 511. After detection that no physical activity was identified 512, an unsigned process 514 was identified for which no GUI 515 was used. In an exemplary embodiment, the unsigned process 514 is transparent to the user because it is executed without a GUI. The attribution of the unsigned process is determined as being created by a web browser 516a, in this case, Google®'s Chrome® via an unknown module 516b. Additionally, other attributes for any of the above-described elements of FIG. 5B may be provided. For example, as shown in FIG. 5B, a temporal attribute may be added for the element 512. That is, no physical activity was during night hours 513. In an exemplary embodiment, the inactivity took place during non-business hours 513. In an exemplary embodiment illustrated in FIG. 5B, the suspect event is the clearing of the event log 511 and the potential security incident may be the unsigned process 514.

In an exemplary embodiment, temporal events that occurred between the suspect event and the possible security incident may be illustrated as icons or elements connected with a line illustrating the temporal flow of the processing. Additionally, concurrent events may also be illustrated as a parallel activity and/or process above or below the suspect event and the possible security incident. These concurrent events may be displayed as they relate to the suspect event and possible security incident. Also, in an exemplary embodiment, attributes and/or characteristics for each even may also be displayed. For example, as shown in FIG. 5B, the potential security incident 514, may have an attribute of being executed transparently to a user e.g., running on a background. As such, an attribute "no GUI" 515 may be displayed.

Further, in an exemplary embodiment, entities associated with a suspect event and/or possible security incident may also be displayed. For example, an entity that caused the suspect event may be identified with an icon (not shown). Also, sources of the potential security incident may also be displayed. Additionally, other entities that may be involved in the potential security incident may also be displayed (not shown). Based on their location on a display, the user may quickly grasp the relevance of an entity in the potential security incident, according to an exemplary embodiment. For example, sources of the potential security incident may be displayed on a right (as shown in FIGS. 5A and 5B), other entities that participate in the security incident may be displayed diagonally from the potential security incident. An entity to which the output of the potential security incident is provided may be positioned above the icon depicting the potential security incident. These are provided by way of an example and not by way of a limitation.

Figure 5C:
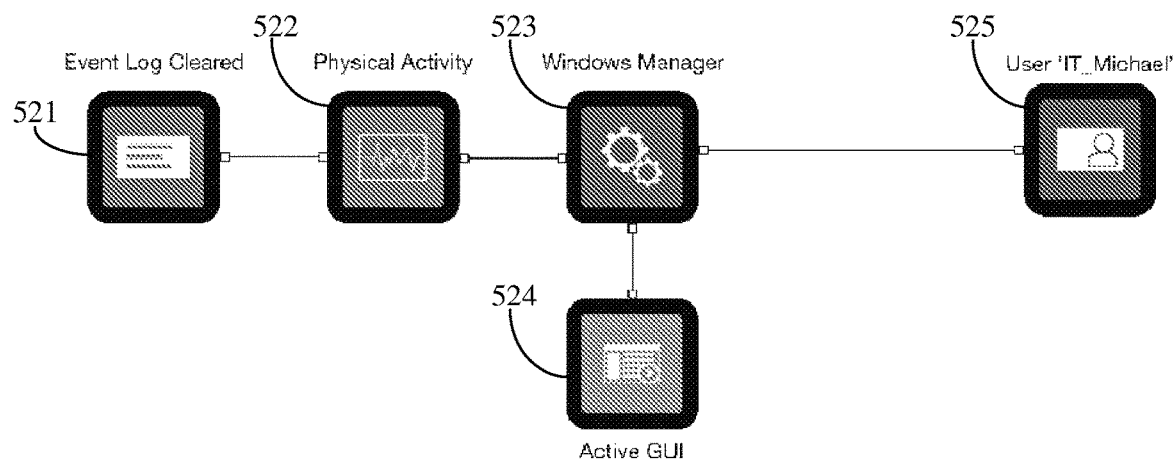
FIG. 5C—is a view illustrating a simulation of a display of a security incident attribution according to an exemplary embodiment; and, FIG. 5D—is a view illustrating a simulation of a display of a security incident attribution according to an exemplary embodiment.

FIG. 5C is a view illustrating attributes of a security incident in which an event log was cleared according to an exemplary embodiment. In an exemplary embodiment, the event log is cleared 521, the attribution leads to a physical activity 522 via an active GUI 524, which is executed by a windows manager 523. A user associated with the active GUI 524 is then identified as "IT Michael" 525.

Figure 5D:
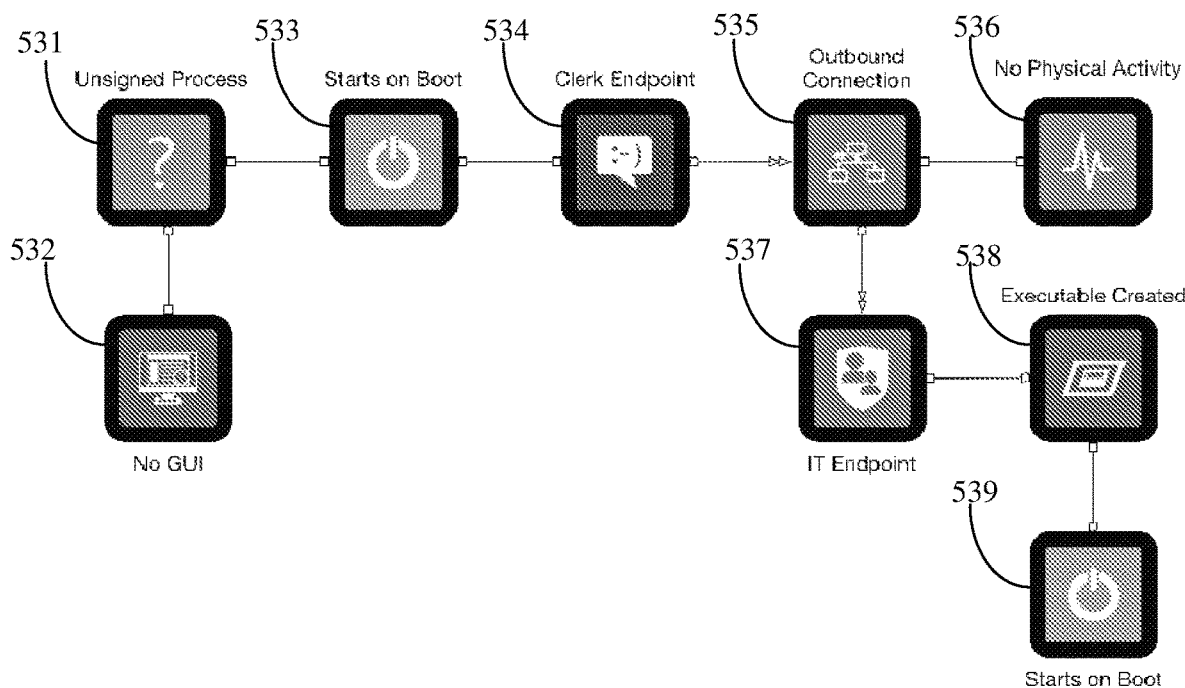

FIG. 5D is a view illustrating attributes of a security incident in which an unsigned process occurred in the system according to an exemplary embodiment. According to an exemplary embodiment, an unsigned process 531 has occurred without a GUI 532. This the attribution leads to an outbound connection that started on the system boot 533. The connection was made by clerk end point 534 via an unbound connection 535. The attribution further indicates that no physical activity was identified on the clerk end point 536, rather the connection request sent from an IT end point 537. Through the IT end point it appears that an executable process created 538 that started on the boot 539 of the clerk end point.

Additionally, a real-time damage assessment may be generated respective of the security incident based on the forensic data. The real-time damage assessments are reports, files, an output on a screen, which may include data respective of a specific source from which the attribution started. In an exemplary embodiment, a viewer may quickly view a potential security incident including temporal related components, attributes of the security incident, and entities involved in the security incident. In an exemplary embodiment, the security incident including its source or sources may be quickly identified and addressed. By using preemptive forensics, processing the forensics data, and generating new data elements, security incidents may be identified in real-time, including their attributes and entities involved, and other elements of the network which may be affected.

Exemplary embodiments are implemented as hardware, firmware, software, or any combination thereof. Moreover, the software is preferably implemented as an application program tangibly embodied on a transitory or a non-transitory computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral components may be connected to the computer platform such as an additional data storage and a printer.

All examples and conditional language recited herein are intended for pedagogical purposes to aid the reader in understanding the principles of exemplary embodiments and the concepts contributed by the inventor to furthering the art, and are to be construed as being without limitation to such specifically recited examples and conditions. Moreover, statements herein reciting principles, aspects, and exemplary embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

A person skilled-in-the-art will readily note that other exemplary embodiments may be achieved without departing from the scope and spirit set forth herein. All such exemplary embodiments are included herein. The scope of the invention should be limited solely by the claims thereto.

The flowchart and block diagrams in the Figures illustrate the architecture, functionality, and operation of possible implementations of systems, methods and computer program products according to various exemplary embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or two blocks may sometimes be executed in the reverse order, depending upon the functionality involved. It will also be noted that each block of the block diagram and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or acts for performing the function in combination with other claimed elements as specifically claimed. The description of the exemplary embodiments has been presented for purposes of illustration and description, but is not intended to be exhaustive or limiting in the form disclosed. Many modifications and variations will be apparent to those of ordinary skill in the art without departing from the scope and spirit of the inventive concept. Exemplary embodiments were chosen and described in order to best explain the principles and the practical application, and to enable others of ordinary skill in the art to understand the inventive concept for various embodiments with various modifications as are suited to the particular use contemplated.

One exemplary embodiment resides in a computer system. Here, the term "computer system" is to be understood to include at least a memory and a processor. In general, the memory will store, at one time or another, at least portions of an executable program code, and the processor will execute one or more of the instructions included in that executable program code. It will be appreciated that the term "executable program code" and the term "software" mean substantially the same thing for the purposes of this description. It is not necessary to the practice one or more exemplary embodiments that the memory and the processor be physically located in the same place. That is to say, it is foreseen that the processor and the memory might be in different physical pieces of equipment or even in geographically distinct locations. One or more exemplary embodiments are necessarily rooted in computer technology and are in a field of network and computer security. They are inextricably tied to a computer technology and address a problem specifically arising in a realm of computer networks.

One exemplary embodiment also has a user interface invocable by an application program. A user interface may be understood to mean any hardware, software, or combination of hardware and software that allows a user to interact with a computer system. For the purposes of this discussion, a user interface will be understood to include one or more user interface objects. User interface objects may include display regions, user activatable regions, and the like. As is well understood, a display region is a region of a user interface which displays information to the user. A user activatable region is a region of a user interface, such as a button or a menu, which allows the user to take some action with respect to the user interface.

A user interface may be invoked by an application program. When an application program invokes a user interface, it is typically for the purpose of interacting with a user. It is not necessary, however, for the purposes of the inventive concept that an actual user ever interact with the user interface. It is also not necessary, for the purposes of the inventive concept, that the interaction with the user interface be performed by an actual user. That is to say, it is foreseen that the user interface may have interaction with another program, such as a program created using macro programming language statements that simulate the actions of a user with respect to the user interface.

Exemplary embodiments were chosen and described in order to explain operations and the practical application, and to enable others of ordinary skill in the art to understand various exemplary embodiments with various modifications as are suited to the particular use contemplated. That is, various modifications to these exemplary embodiments will be readily apparent to those skilled in the art, and the generic principles and specific examples defined herein may be applied to other embodiments without the use of inventive faculty. For example, some or all of the features of the different exemplary embodiments discussed above may be combined into a single embodiment. Conversely, some of the features of a single exemplary embodiment discussed above may be deleted from the embodiment. Therefore, the inventive concept is not intended to be limited to the exemplary embodiments described herein but is to be accorded the widest scope as defined by the limitations of the claims and equivalents thereof.

What is claimed is:

1. A computerized method of managing data security comprising:
    establishing normal behavior patterns of a plurality of devices of a network based on forensic data collected from the plurality of devices, wherein establishing the normal behavior patterns is based, at least in part, on evaluating the collected forensic data against a first set of rules that indicate both normal and abnormal behavior patterns and training a neural network to mimic behavior patterns of the plurality of devices and continuing to train the trained neural network with new forensic data collected from the plurality of devices;
    monitoring operation of the network with reference to the normal behavior patterns while continuing to collect forensic data about the network;
    identifying a first abnormal behavior with respect to the normal behavior patterns, wherein the first abnormal behavior is in the forensic data collected after establishing the normal behavior patterns; and
    based on identifying the first abnormal behavior, determining whether the first abnormal behavior corresponds to a security incident according to a second set of rules that specify events and activities that relate to security incidents.

2. The method of claim 1, wherein determining whether the first abnormal behavior corresponds to a security incident comprises analyzing a subset of the forensic data corresponding to the first abnormal behavior against the second set of rules.

3. The method of claim 1, wherein identifying the first abnormal behavior comprises detecting a significant deviation from the normal behavior patterns with the neural network.

4. The method of claim 1, wherein the forensic data is continuously collected by agents installed on the devices.

5. The method of claim 1 further comprising setting the normal behavior patterns as references for monitoring the network.

6. The method of claim 1 further comprising generating a damage assessment based, at least in part, on determining that the first abnormal behavior corresponds to a security incident.

7. A non-transitory computer readable medium storing executable instructions the instructions comprising instructions to:
    establish normal behavior patterns of a plurality of devices of a network based on forensic data collected from the plurality of devices, wherein the instructions to establish the normal behavior patterns comprise instructions to evaluate the collected forensic data against a first set of rules that indicate both normal and abnormal behavior patterns and training a neural network to mimic behavior patterns of the plurality of devices and continuing to train the trained neural network with new forensic data collected from the plurality of devices;
    monitor operation of the network with reference to the normal behavior patterns while continuing to collect forensic data about the network continues;
    identify an abnormal behavior with respect to the normal behavior patterns, wherein the abnormal behavior is in the forensic data collected after establishing the normal behavior patterns; and
    based on identification of an abnormal behavior, determine whether the abnormal behavior corresponds to a security incident according to a second set of rules that specifies events and activities that relate to security incidents.

8. The non-transitory computer readable medium of claim 7, wherein the instructions to determine whether the abnormal behavior corresponds to a security incident comprise instructions to analyze a subset of the forensic data corresponding to the abnormal behavior against the second set of rules.

9. The non-transitory computer readable medium of claim 7, wherein the instructions to identify an abnormal behavior comprise instructions to detect a significant deviation from the normal behavior patterns with the neural network.

10. An apparatus comprising:
    a processor;
    a non-transitory machine-readable medium having instructions stored thereon, the instructions executable by a processor to cause the apparatus to,
    establish normal behavior patterns of a plurality of devices of a network based on forensic data collected about the plurality of devices,
    wherein the instructions to establish the normal behavior patterns comprise instructions to evaluate the collected forensic data against a first set of rules that indicate both normal and abnormal behavior patterns and training a neural network to mimic behavior patterns of the plurality of devices and continuing to train the trained neural network with new forensic data collected from the plurality of devices;
        monitor operation of the network with reference to the normal behavior patterns while collection of forensic data about the network continues;
        identify an abnormal behavior with respect to the normal behavior patterns, wherein the abnormal behavior is in the forensic data collected after establishment of the normal behavior patterns; and
        based on identification of an abnormal behavior, determine whether the abnormal behavior corresponds to a security incident according to a second set of rules that specify events and activities that relate to security incidents.

11. The apparatus of claim 10, wherein the non-transitory machine-readable medium further has stored thereon instructions executable by the processor to cause the apparatus to communicates with agents installed on the plurality of devices to receive the forensic data collected by the agents.

12. The apparatus of claim 10, wherein the instructions to identify an abnormal behavior comprise instructions to detect a significant deviation from the normal behavior patterns with the neural network.

13. The apparatus of claim 10, wherein the non-transitory machine-readable medium further has stored thereon instructions executable by the processor to cause the apparatus to set the normal behavior patterns as references for monitoring the network.

14. The apparatus of claim 10, wherein the non-transitory machine-readable medium further has stored thereon instructions executable by the processor to cause the apparatus to generate a damage assessment based, at least in part, on a determination that the abnormal behavior corresponds to a security incident.

* * * * *

UNITED STATES PATENT AND TRADEMARK OFFICE
CERTIFICATE OF CORRECTION

PATENT NO. : 10,652,274 B2
APPLICATION NO. : 16/391285
DATED : May 12, 2020
INVENTOR(S) : Barak et al.

Page 1 of 1

It is certified that error appears in the above-identified patent and that said Letters Patent is hereby corrected as shown below:

In the Claims

Column 12, Line 63, please replace the word -communicates- with --communicate--.

Signed and Sealed this
Seventh Day of July, 2020

Andrei Iancu
*Director of the United States Patent and Trademark Office*